United States Patent Office 3,147,823
Patented Sept. 8, 1964

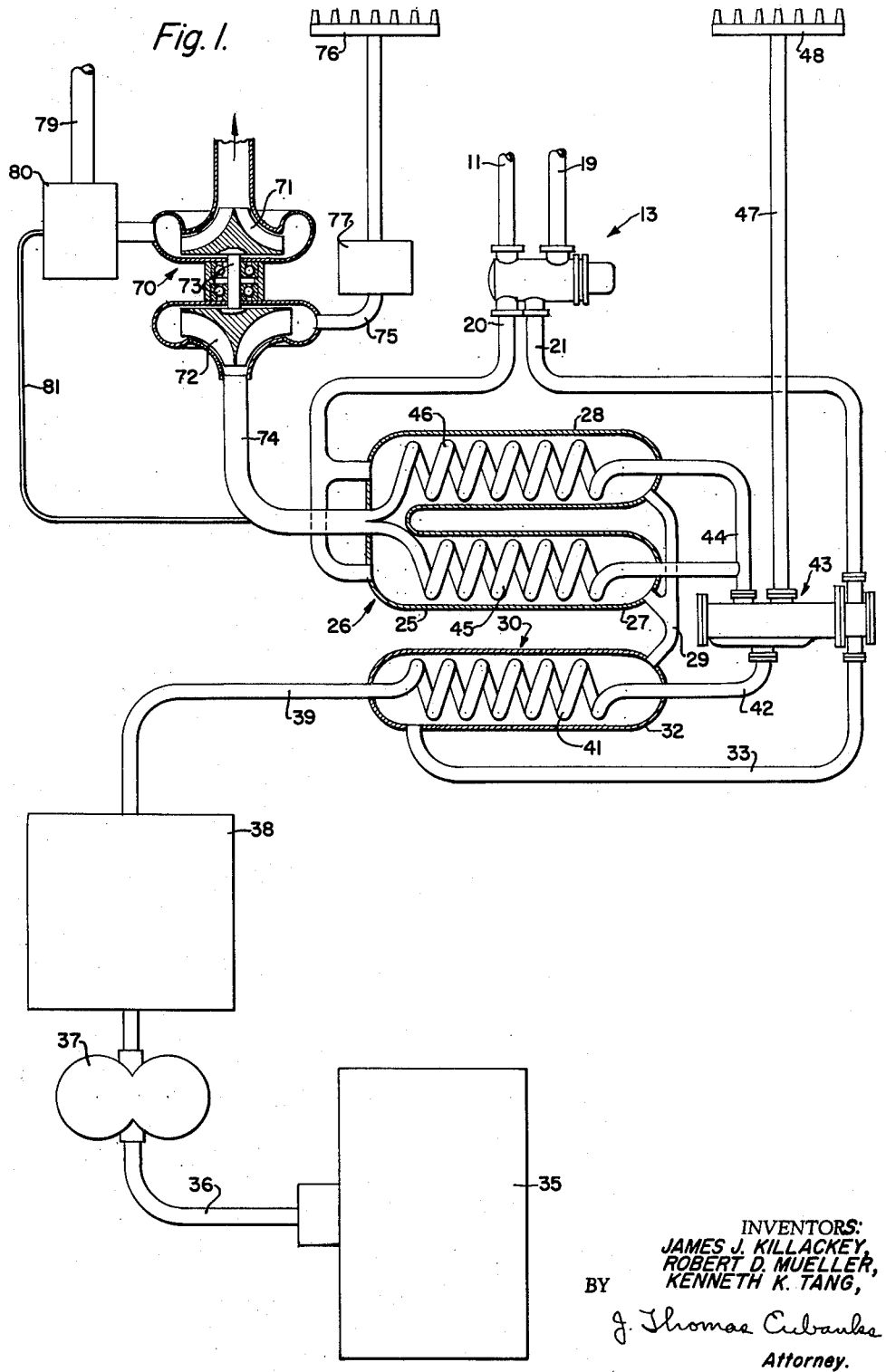

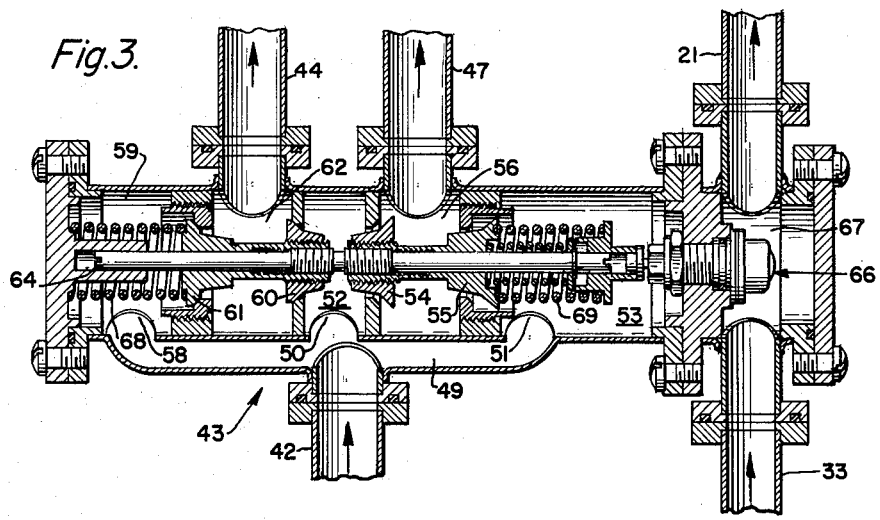
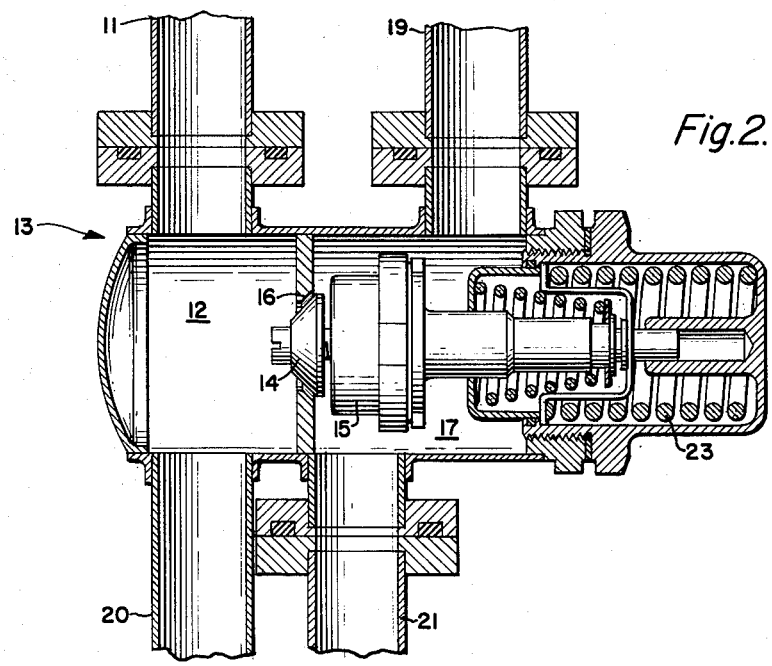

3,147,823
FUEL EVAPORATIVE ENGINE OIL COOLING SYSTEM
James J. Killackey, Manhattan Beach, and Robert D. Mueller and Kenneth K. Tang, Los Angeles, Calif., assignors to The Garrett Corporation, Los Angeles, Calif., a corporation of California
Filed Nov. 23, 1962, Ser. No. 239,712
3 Claims. (Cl. 184—6)

This invention relates to heat transfer systems and more particularly to heat transfer systems for fluid cooling.

The trend in aircraft performances in the direction of higher speeds and altitudes is placing an ever-increasing emphasis on the problem of cooling the engine oil of the aircraft. Cooling systems which are effective under many conditions of operation have been found to be inadequate or entirely ineffective for cooling the engine oil when the aircraft is operating at high speeds and/or high altitudes.

A commonly used cooling system that becomes ineffective for cooling the oil of aircraft engines when the aircraft is operated at high speeds is the ram air type system wherein ambient air is introduced into a heat exchanger to cool the engine lubricating oil passing through coils or passes of the heat exchanger. While this system is effective under many conditions of operation it becomes unusable at flight speeds wherein the temperature of the air introduced into the exchanger is heated by ram compression to a temperature which exceeds the maximum engine oil temperature.

Due to the excessively high temperature of the ram air introduced into the cooling system at high speeds, other or supplemental oil cooling means are required. One such supplemental means utilizes an expendable evaporant, such as water, as an evaporative heat sink. Obviously, the amount of water required is proportional to the total heat rejection required, and the penalty in terms of weight becomes large for those aircraft designed to operate for extended periods at very high speeds.

Some cooling systems avoid the weight penalty of the water evaporative system by utilizing the liquid fuel flowing to the engine, rather than an expandable evaporant, as a heat sink to cool the engine oil. In systems of this type, the liquid fuel is conducted through a heat exchanger in heat transfer relationship with the engine oil, and heat is transferred from the oil to the liquid fuel. The cooling capacity in this type of system is limited by the quantity of fuel consumed by the engine and the cooling capacity of the liquid fuel is often inadequate for high altitude flights where the quantity of fuel consumed is less than at lower altitudes.

In present cooling systems wherein fuel is utilized as a heat sink to cool the engine oil, the fuel is kept in the liquid state and is not allowed to vaporize in the heat exchangers. The cooling capacity of the fuel in these systems, therefore, is not fully utilized.

The present invention is an improvement over prior systems utilizing engine fuel as a heat sink to cool the engine lubricating oil and it is an object of the invention to fully utilize the cooling capacity of the fuel.

In accordance with the invention, liquid fuel from the main engine fuel pump enters the system and is used in its liquid state to cool the engine lube oil. However, if the cooling capacity of the liquid fuel is insufficient, the system provides means for diverting a portion of the fuel to an evaporative oil cooler. The pressure in the evaporator is then reduced and the fuel is allowed to vaporize.

Thus it is a further object of the present invention to provide a cooling system of the aforementioned type wherein a portion of the fuel is vaporized and the latent heat of the fuel is utilized to provide additional oil cooling.

It is another object of the invention to regulate the amount of fuel by-passed to the evaporator so as to maintain a constant oil outlet temperature.

It is still another object of the invention to provide a cooling system of the aforementioned type wherein a constant evaporator boiling pressure is maintained over the entire range of evaporator fuel flows.

Other and further objects and advantages of the invention will be apparent from the disclosure in the following specification, appended claims and the accompanying drawings in which:

FIGURE 1 is a schematic representation of a preferred form of the cooling system of the present invention;

FIGURE 2 is a cross sectional view of the oil by-pass and pressure relief valve schematically shown in FIGURE 1; and FIGURE 3 is a cross sectional view of the fuel by-pass valve schematically shown in FIGURE 1.

Referring to FIGURE 1 of the drawings, there is shown schematically a system in accordance with the present invention for cooling a supply of engine lubricating oil. In the preferred embodiment shown in the drawing, the lubricating oil is conducted from an engine (not shown) through an oil line 11 to an inlet chamber 12 of a by-pass and pressure relief valve shown generally at 13. The valve 13 includes a valve element 14 integrally connected to a thermostatic element 15. The valve element 14 is actuated by the expansion or contraction of the thermostatic element 15 and co-operates with a by-pass port 16 to control the flow of oil from the inlet chamber 12 through the port 16 to an outlet chamber 17.

When the temperature of the oil in the outlet chamber 17 is below the preselected by-pass closing temperature, the thermostatic element 15 is contracted and the oil passes from the inlet chamber 12 through the open by-pass port 16 to the outlet chamber 17 and flows through a line 19 back to the engine, thus by-passing the cooling system. When the temperature of the oil is above the preselected by-pass closing temperature, the thermostatic element 15 expands and seats the valve element 14 on the by-pass port 16. The oil is then routed from the inlet chamber 12 to the cooling system through a line 20. Oil returning from the cooling system is conducted to the outlet chamber 17 through a line 21 and then flows from the chamber 17 to the engine through the line 19.

Pressure relief means including a spring 23 are incorporated in the by-pass valve 13 to permit the oil to by-pass the cooling system during periods of excessive oil pressure drop across the system. If the oil flowing through the cooling system is not warm enough to flow freely, or if flow is obstructed for any reason, oil pressure builds up rapidly in the inlet chamber 12, while oil pressure in the outlet chamber 17 builds up more slowly or decreases. When the pressure differential across the inlet and outlet chambers exceeds the force of the spring 23, the valve element 14 is forced off its seat in the by-pass port 16 and oil flows directly from the inlet chamber 12 through the port 16 to the outlet chamber 17 and is discharged through the line 19 to the engine, thus by-passing the cooling system.

The oil line 20 leading from the inlet chamber 12 of the by-pass valve 13 is connected to a header 25 of a fuel evaporative oil cooler 26. The cooler 26 includes two cylindrical shells 27 and 28 secured on one end to the header 25. The ends of the cooler shells opposite the header 25 are closed and a line 29 is connected to the closed ends to convey the oil from the shells 27 and 28 to a liquid fuel oil cooler 30.

The fuel oil cooler 30 includes a cylindrical shell 32 closed at both ends. The line 29 from the evaporative oil cooler 26 is connected to one end of the shell to introduce oil into the cooler and a line 33 is connected to the opposite end of the shell to convey oil from the cooler 30 to the engine as hereinafter described.

A tank 35 containing a supply of fuel for the engine is connected by a tube 36 to a pump 37 which may be driven by the engine or any other suitable source of power. The liquid fuel is pumped to an engine fuel control unit 38 which permits a preselected quantity of liquid fuel to flow through a tube 39 to the cooling system. The tube 39 is connected to a coil 41 disposed within the shell 32 of the liquid fuel oil cooler 30 so that the liquid fuel flows through the coil in a direction counter to the oil flowing through the shell.

The liquid fuel flowing from the coil 41 is conveyed through a tube 42 to a fuel by-pass valve 43 which regulates the amount of fuel by-passed to the fuel evaporative oil cooler 26 so as to maintain the oil returned to the engine at a constant preselected temperature. If the capacity of the liquid fuel oil cooler 30 is insufficient to cool the oil to the preselected temperature a portion of the fuel is by-passed through a tube 44 to coils 45 and 46 in shells 27 and 28 of the fuel evaporative oil cooler 26 in a direction counter to the flow of oil through the shells for supplementary cooling of the oil in the manner hereinafter described. Simultaneously, the portion of the liquid fuel which is not by-passed to the fuel evaporative coils 45 and 46 flows through the fuel by-pass valve 43 and is conveyed through a duct 47 to a plurality of liquid fuel injection nozzles 48 disposed in the engine. Baffles and turbolators may be utilized in the fuel evaporative oil cooler shells and in the evaporative coils in the manner described above for the liquid fuel oil cooler.

As shown in FIGURE 3 of the drawings, the liquid fuel flowing from the liquid fuel oil cooler 30 through the tube 42 is conveyed to an inlet chamber 49 formed in the fuel by-pass valve 43. As the liquid fuel in the tube 42 enters the chamber 49 it is divided into a stream flowing to the injection nozzles 48 and a stream by-passed to the fuel evaporative oil cooler 26. The portion of the fuel flowing to the liquid fuel injection nozzles 48 is divided into two streams in the inlet chamber 49 which respectively flow through openings 50 and 51 to chambers 52 and 53 and act on poppet valves 54 and 55 in opposite directions so as to cancel out pressure differentials. As the two fluid streams pass through the ports at the valves 54 and 55 they are joined together in an outlet chamber 56 and conducted through the tube 47 to the injection nozzles 48. The portion of the fuel which is by-passed through the valve 43 to the coils 45 and 46 in the shells 27 and 28 of the fuel evaporative oil cooler 26 is divided into two streams in the inlet chamber 49 which respectively flow through openings 50 and 58 to chambers 52 and 59 and act on poppet valves 60 and 61 in opposite directions so as to cancel out pressure differentials. As the two fluid streams pass through the ports at the valves 60 and 61 they are joined together in an outlet chamber 62 and conducted through the tube 44 to the coils 45 and 46.

The poppet valves 54, 55, 60 and 61 are mounted on common shaft 64 which is operatively connected to a thermostatic element 66. The thermostatic element 66 is disposed in a passage 67 in the fuel by-pass valve 43 so as to be subjected to the temperature of the engine oil flowing from the liquid fuel oil cooler 30 to the by-pass and relief valve 13 and the shaft 64 is actuated by the expansion or contraction of the element. Springs 68 and 69 are provided to assist the thermostatic element 66 in repositioning the poppet valves when the thermostatic element expands or contracts due to changes in temperature of the engine oil.

As shown in FIGURE 1, the cooling system includes a turbo compressor 70 comprising a turbine 71 and a compressor 72 connected by a shaft 73. The inlet of the compressor 72 is connected to the coils 45 and 46 in the fuel evaporative oil cooler 26 by a conduit 74 and fuel vapor is exhausted from the coils to reduce the pressure therein when the compressor is operating. The fuel vapor exhausted from the evaporator coils is compressed in the compressor 72 and delivered through a duct 75 to a plurality of vapor fuel nozzles 76 for injection into the engine combustion chambers. A check valve 77 is installed in the duct 75 to prevent back flow from the engine combustion chambers during periods when the fuel vapor compressor is not operating.

High pressure air to drive the turbine 71 is derived from the engine or other source (not shown) and is conveyed to the turbine through a duct 79 and a turbine control valve 80. The control valve 80 functions in the manner hereinafter described to maintain a constant evaporator boiling pressure over the entire range of evaporator fuel flows and may be of any type well known in the art. The control valve senses the static pressure level at the evaporator outlet (compressor inlet) through a line 81 and, in response to changes in this pressure, modulates the flow of air to the turbine to drive the compressor at the speed required to exhaust fuel vapor from the evaporator coils and deliver it under pressure to the vapor injection nozzles 76.

In the following description of the operation of the cooling system the temperatures cited are utilized for purpose of illustration only and it is to be understood that the operation of the system is not to be limited to these temperatures.

When the temperature of the engine oil is below 200° F., the thermostatic element 15 in the by-pass and pressure relief valve 13 is contracted and the valve element 14 is positioned to permit flow through the port 16. During this phase of the operation oil will flow through the line 11 to the inlet chamber 12, pass through the open port 16 and across the thermostatic element 15 to the outlet chamber 17, and return directly to the engine through the line 19. When the temperature of the oil reaches 200° F., the thermostatic element 15 will start to expand and the valve element 14 will begin to move toward the port 16 to restrict the flow of oil through the bypass. When the oil temperature reaches 250° F. the valve element 14 will be fully seated against the by-pass port 16 and the total oil flow will be directed through line 20 to the cooling system. If, while the valve element 14 is seated on the by-pass port 16, the pressure drop across the cooling system should increase and exceed the normal oil pressure drop by 5 p.s.i., the spring 23 in the by-pass and pressure relief valve 13 will yield and the valve element 14 will be forced off the by-pass port 16. The oil will then flow from the inlet chamber 12 through the port 16 to the outlet chamber 17 and return directly to the engine through the line 19.

When the temperature of the oil flowing from the liquid fuel oil cooler 30 through line 33 to the fuel by-pass valve 43 is below 390° F., the thermostatic element 66 in the fuel by-pass valve 43 will be contracted and the poppet valves 60 and 61 will be seated on their respective ports. In this phase of the operation, the liquid fuel in coil 41 of the liquid fuel oil cooler 30 has sufficient capacity to absorb the entire oil heat load and no fuel will flow to the coils 45 and 46 in the fuel evaporative cooler 30. Therefore, all the fuel flowing from the liquid fuel oil cooler 30 will pass through the open ports at the poppet valves 54 and 55 and flow through the duct 47 to the liquid fuel injection nozzles 48.

If the cooling capacity of the fuel in the liquid fuel oil cooler 30 is insufficient and the temperature of the oil flowing from the cooler 30 through line 33 to the fuel by-pass valve 43 increases and reaches 390° F., the thermostatic element 66 in the fuel by-pass valve 43 will start to expand and move the shaft 64 to the left, as shown in FIGURE 3, thereby cracking open the fuel by-pass poppet valves 60 and 61. A small portion of the fuel is then by-passed through the outlet chamber 62 and the tube 44 to the coils 45 and 46 of the fuel evaporative oil cooler 26. The by-passed fuel is vaporized in the coils and the latent heat of the fuel is utilized to provide additional oil cooling. The remainder of the fuel flowing from the cooler 30 passes through the ports at poppet valves 54 and 55 and flows through the duct 47 to the liquid fuel injection nozzles 48.

If the oil temperature continues to increase and exceeds 390° F., the shaft 64 continues to move in the leftwardly direction until, at 400° F., the poppet valves 54 and 55 seat on their respective ports and close off flow of fuel through the outlet chamber 56 and the duct 47 to the liquid fuel injection nozzles 48. All the fuel flowing from the cooler 30 will then pass through the open ports at the poppet valves 60 and 61 and be vaporized in the coils 45 and 46 in the fuel evaporative oil cooler 26.

When the oil temperature starts decreasing the fuel by-pass poppet valves 60 and 61 will move toward the closed position to restrict the flow of fuel to the coils 45 and 46 in the fuel evaporative oil cooler 26. When the temperature of the oil reaches 380° F. the poppet valves 60 and 61 will be closed and flow to the coils 45 and 46 in the fuel evaporative oil cooler 26 will cease.

The turbine control valve 80 will seek to maintain a constant preselected pressure in the evaporator coils 45 and 46 by modulating the flow of high pressure fluid from the duct 79 to the turbine 71. When the poppet valves 60 and 61 crack open and admit a small fuel flow to the coils 45 and 46, the fuel will immediately vaporize and cause the pressure in the coils to increase beyond the preselected pressure. The pressure in the coils is transferred through the line 81 to the turbine control valve 80 to actuate the valve and admit high pressure fluid from the duct 79 to drive the turbine 71. The turbine 71 drives the compressor 72 through the shaft 73 and fuel vapor is exhausted from the evaporator coils through the conduit 74 to reduce the pressure in the coils and permit the fuel to vaporize. The fuel vapor exhausted from the evaporator coils is compressed in the compressor 72 and delivered through the duct 75 to the vapor fuel nozzles 76 for injection into the engine combustion chambers.

As the pressure in the coils 45 and 46 tends to fluctuate, the valve 80 will modulate the power delivered to the turbine to establish the proper compressor speed to maintain the preselected pressure. When the pressure in the coils 45 and 46 falls below the preselected control setting, the pressure level in the line 81 will permit the control valve 80 to close and shut off the flow of high pressure air to the turbine and the compressor will shut down. The check valve 77 will then close and prevent backflow from the engine combustion chambers to the cooling system.

While the subject invention is directed specifically to the problem of cooling engine lubricant oil, it is to be understood that its utility is not limited thereto since it may be applied to the cooling of other heat sources on aircraft or vehicles, as will be apparent to those skilled in the art.

We claim:
1. An engine oil cooling system comprising:
means establishing a path of flow of engine oil from the engine and back thereto;
first and second cooler means serially connected in said path for flow of oil therethrough;
a source of liquid engine fuel;
passage means in said first cooler means connected to said source of engine fuel for passing liquid fuel in heat exchange relationship with the oil in said first cooler;
conduit means for conducting liquid fuel from said passage means in said first cooler to the engine;
vaporization means including a coil disposed in said second cooler in heat exchange relationship with the oil in said second cooler;
means for by-passing a portion of the fuel from said conduit means to said vaporization coil to effect additional cooling of the oil when the temperature of the oil returning to the engine exceeds a preselected temperature;
and pressure control means for maintaining a constant evaporative pressure in said vaporization coil.

2. An engine oil cooling system comprising:
means establishing a path of flow of engine oil from the engine and back thereto;
first and second cooler means serially connected in said path for flow of oil therethrough;
a source of liquid engine fuel;
passage means in said first cooler means connected to said source of engine fuel for passing liquid fuel in heat exchange relationship with the oil in said first cooler;
conduit means for conducting liquid fuel from said passage means in said first cooler to the engine;
vaporization means including a coil disposed in said second cooler in heat exchange relationship with the oil in said second cooler;
means for by-passing a portion of the fuel from said conduit means to said vaporization coil to effect additional cooling of the oil when the temperature of the oil returning to the engine exceeds a preselected temperature;
a turbocompressor comprising a turbine arranged to be driven by a motive fluid and a compressor driven by said turbine and connected to said vaporization coil to exhaust fuel vapor therefrom;
and means responsive to pressure in said vaporization coil for modulating the flow of motive fluid to said turbine to drive the compressor at the speed required to maintain a constant evaporative pressure in said vaporization coil.

3. An engine oil cooling system comprising:
means establishing a path of flow of the engine oil in a closed circuit from the engine and back thereto;
first and second cooler means serially connected in said path for flow of oil therethrough;
passage means in said first cooler means for passing liquid fuel for the engine in heat exchange relationship with the oil in said first cooler;
conduit means for conducting liquid fuel from said passage means in said first cooler to the engine;
vaporization means including a coil disposed in said second cooler in heat exchange relationship with the oil in said second cooler;
a thermostatic element disposed in said path of flow of the engine oil to sense the temperature of the oil returning to the engine;
means associated with said thermostatic element for by-passing a portion of the fuel from said conduit means to the vaporization coil in said second cooler to effect additional cooling of the oil when the temperature of the oil returning to the engine exceeds a preselected temperature;
a turbocompressor comprising a turbine arranged to be driven by a motive fluid and a compressor driven by said turbine and connected to said vaporization coil to exhaust fuel vapor therefrom;
means responsive to pressure in said vaporization coil for modulating the flow of motive fluid to said turbine to drive the compressor at the speed required to maintain a constant evaporative pressure in said vaporization coil;
and means for conducting compressed fuel vapor from said compressor to the engine.

References Cited in the file of this patent
UNITED STATES PATENTS

| | | |
|---|---|---|
| 1,630,767 | Schmidt | May 31, 1927 |
| 2,227,686 | Wittmann | Jan. 7, 1941 |
| 2,907,527 | Cummings | Oct. 6, 1959 |